May 28, 1929.  W. A. MEIGHAN  1,714,798
SAWING DEVICE
Filed Aug. 2, 1927   4 Sheets-Sheet 1

Inventor
William A. Meighan

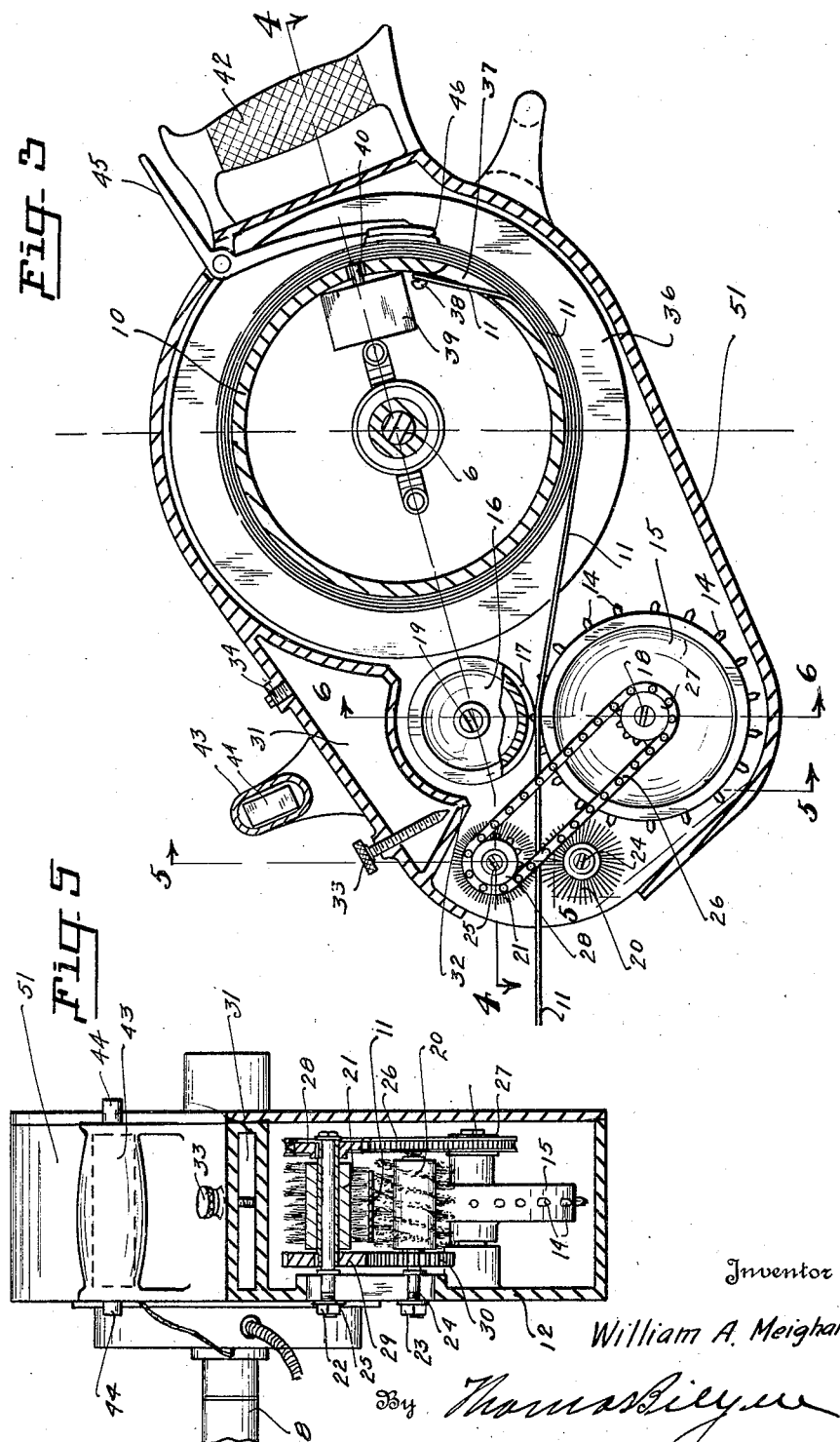

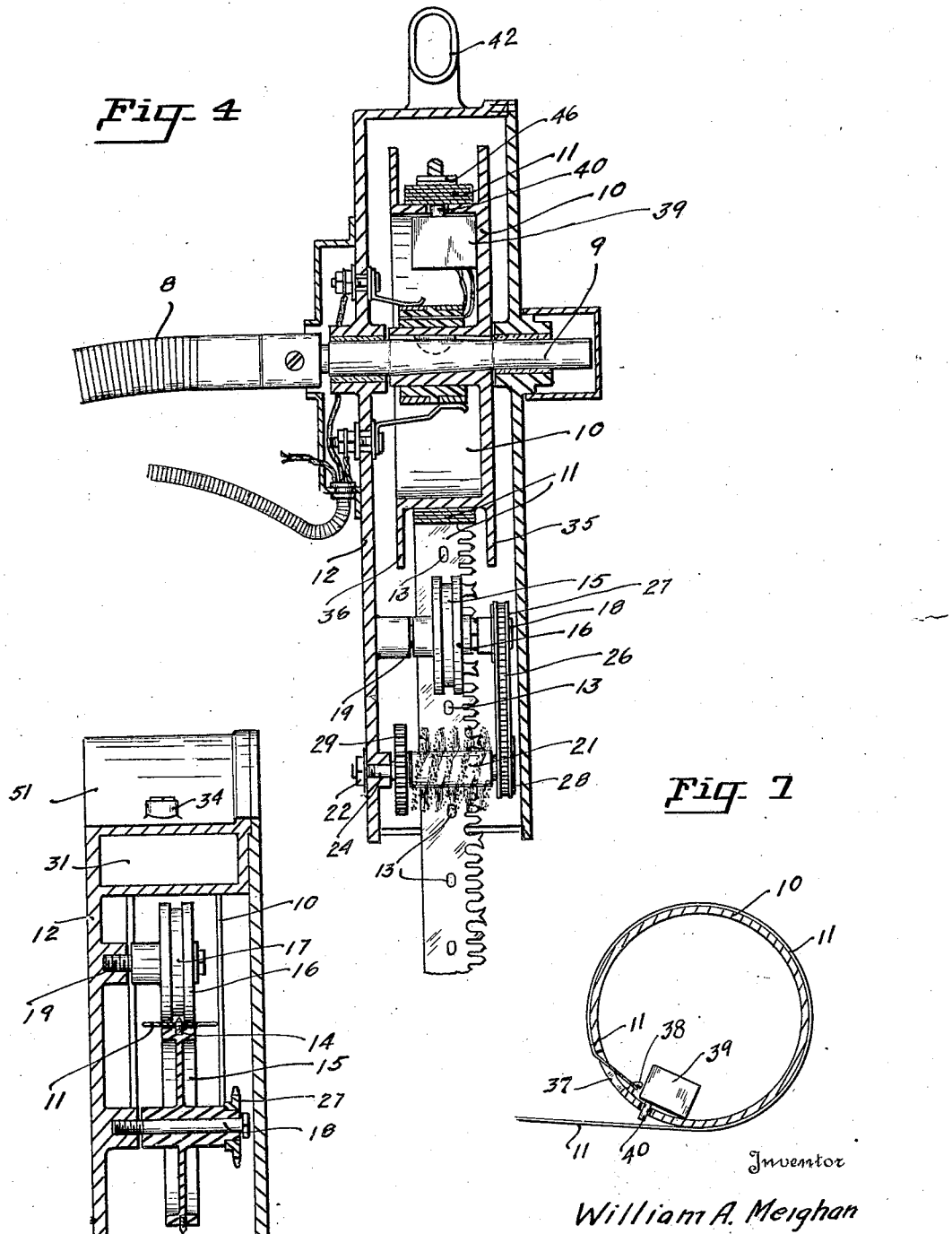

May 28, 1929.　　　W. A. MEIGHAN　　　1,714,798
SAWING DEVICE
Filed Aug. 2, 1927　　　4 Sheets-Sheet 4
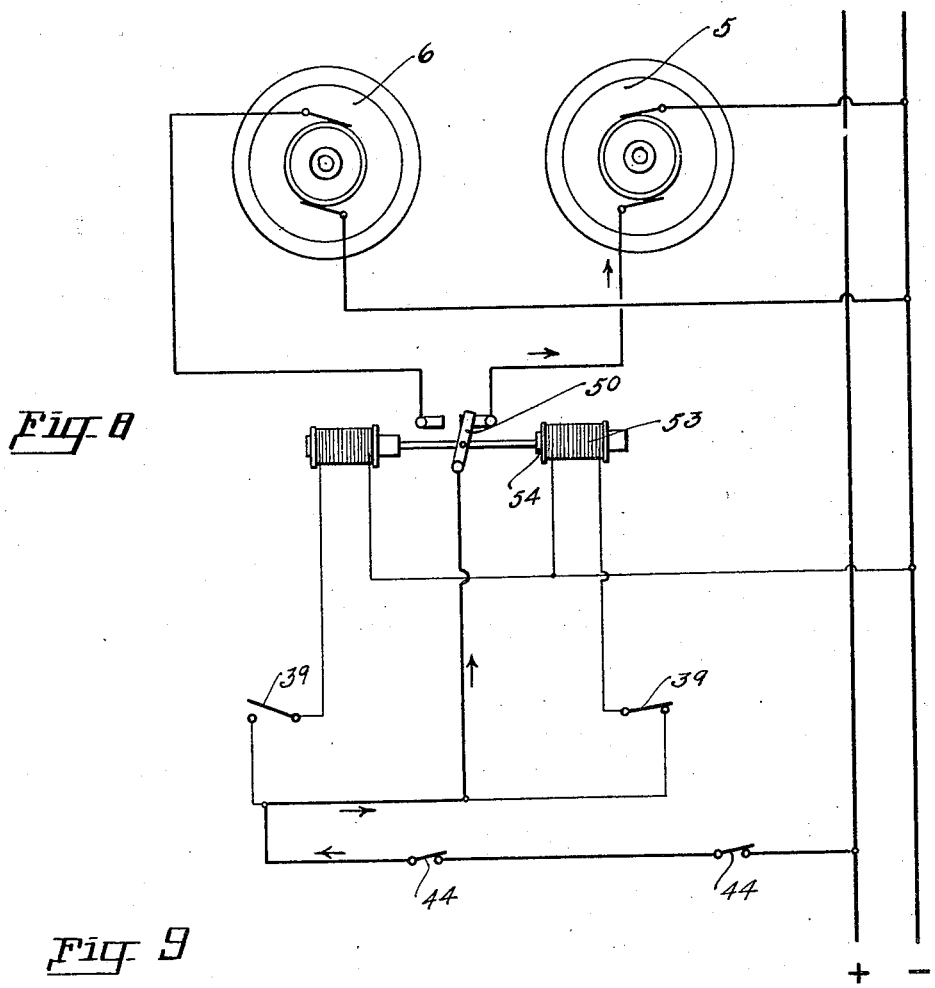
Fig. 8
Fig. 9
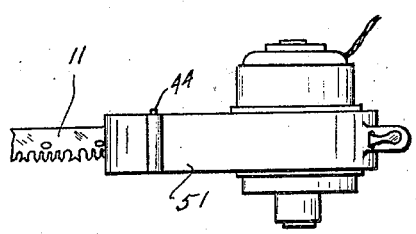
Inventor
William A Meighan
By Thomas Bilyeu
Attorney Patented May 28, 1929.

UNITED STATES PATENT OFFICE.

1,714,798

WILLIAM A. MEIGHAN, OF PORTLAND, OREGON.

SAWING DEVICE.

Application filed August 2, 1927. Serial No. 210,068.

My device relates to sawing devices wherein a flexible saw blade is reciprocated by power means, the blade being relatively thin and being further adapted to being wound about a drum disposed at either end of the same, means being provided about the winding drum that actuates an electric switch and when the same is actuated the same determine the direction that the winding drums are to be driven. Automatic means are provided for changing the direction of rotation of the winding mechanism. Further means are provided for driving the winding mechanism from a common power center. Automatic and manually operable switches are provided for stopping, starting and reversing the direction of rotation of the power unit.

My device is adapted for use in the falling and bucking of timber, and is primarily adapted for use on the Pacific Coast where the trees and logs are relatively large in diameter and where a device is particularly desirable that is rapid in its operation and that can be made portable for the cutting of logs and trees in large commercial quantities.

A still further object of my device consists in the construction of a device that is adapted to the using of a relatively thin blade thus increasing the cutting speed of the saw and at the same time lessening the power required to operate the same.

A still further object of my device consists in providing simple and efficient means for maintaining the saw blade in alignment and position through the placing of a series of guide holes within the blade through which pass guide projections disposed upon the outer periphery of the guide wheels for maintaining the same in position and alignment.

And still further objects of my invention consist in providing simple and efficient means for maintaining the saw blade in a relatively clean condition in advance of the same being wound about the winding drum after each cutting operation.

An additional object of my device consists in providing a device that is adapted to the use of a relatively long cutting blade thus increasing the useful life of each blade between conditioning and reconditioning, filing and setting operations.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 3 is a side, sectional, elevation of one of the winding heads.

Fig. 4 is a sectional view, taken on line 4—4 of Fig. 3, looking in the direction indicated.

Fig. 5 is an end, sectional view, taken on line 5—5 of Fig. 3, looking in the direction indicated.

Fig. 6 is a fragmentary, sectional, end view, taken on line 6—6 of Fig. 3, looking in the direction indicated.

Fig. 7 is a fragmentary, sectional, side elevation of the winding drum made to illustrate a preferred embodiment for the making and breaking of the electric current for the reversing of the direction of the travel of the saw.

Fig. 8 is a diagrammatical, electrical wiring lay-out.

Fig. 9 is a top, plan view, of another preferred embodiment of the winding head having a power unit directly disposed within the winding head.

Like reference characters refer to like parts throughout the several views.

Figure 1:
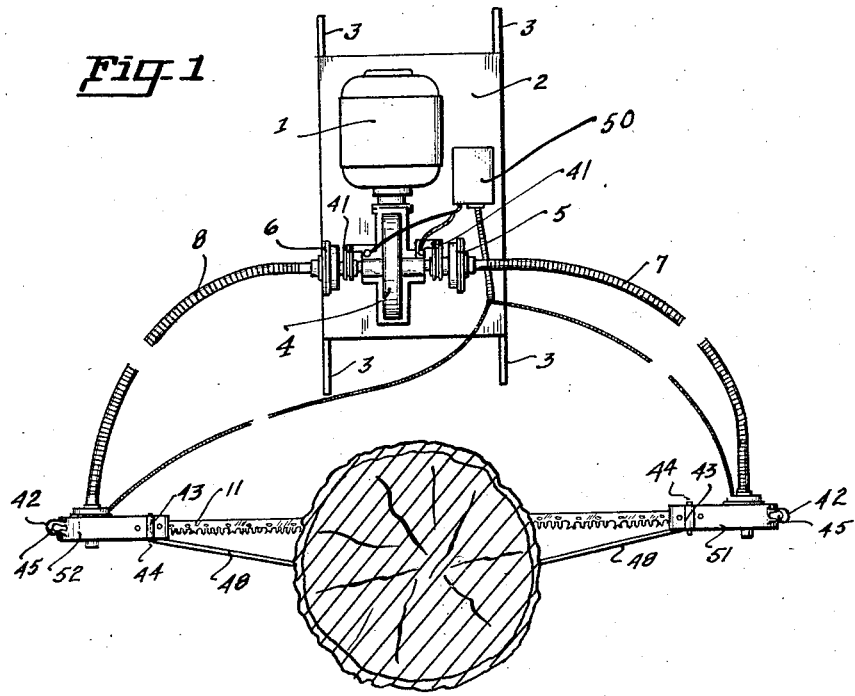
Fig. 1 is a top plan view of my assembled device, shown in position for felling a tree.
Figure 2:
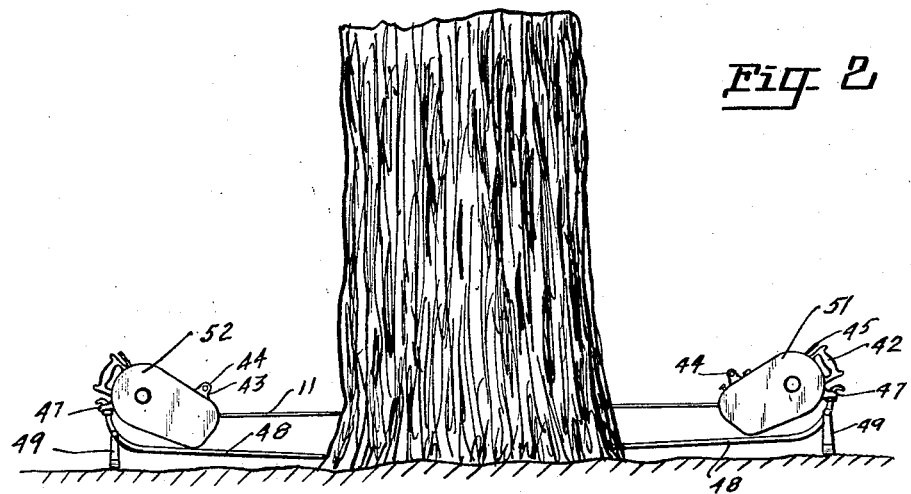
Fig. 2 is a front elevation of the mechanism illustrated in Fig. 1.

In the operation of my device, power is furnished through a central prime mover, as a motor 1, mounted upon a portable base 2. The base is preferably made having handles 3, disposed at either end that may be utilized by the operators in the carrying of the same from place to place. The power unit 1, coacts with a speed reducer 4, that lessens the speed rotation of the mechanism driven by the prime mover 1. The central shaft of the speed reducer 4, has magnetic clutches 5 and 6 disposed at either end and serves to energize a flexible driving shaft secured to the outer end of the shaft upon which the magnetic clutches are placed. The flexible shafts 7 and 8 coact with and drive the winding heads, one of which is disposed on the outer end of each of the flexible shafts. The flexible shaft is directly secured to and drives a spindle 9, illustrated in Fig. 4. The spindle 9 is journaled within suitable bearings in the housing mechanism and the flexible shaft is adapted to be connected with either end of the spindle, thus eliminating the necessity of making the winding heads right and left hand operating. Disposed about the spindle 9 is a winding drum or reel 10, about which the flexible ribbon-like saw blade 11 is wound and unwound.

I preferably make the frame of my winding head, as illustrated in detail in Fig. 3 and Fig. 5, preferably made of a side frame 12, having hubs disposed upon the inner side of the side frame, into which the respective spindle shafts are journaled for maintaining the various operating devices disposed and journaled therein. The ribbon-like blade 11 has cutter and raker teeth disposed upon one edge of the same and is preferably of flexible material adapted to be wound about a relatively small winding drum 10. In order to maintain the saw in alignment and to permit of a substantial crowding of the saw against the tree or log to be cut, it is necessary to provide means for the crowding of the saw against the material. My experience has been that it is not practical in this kind of service to run the saw against a disk wheel, but I have secured satisfactory results by forming holes 13 in spaced relationship within the blade into which tapered teeth 14, disposed upon the outer periphery of the guide-wheel 15 are formed. These teeth are in like spaced relationship to that of the openings 13, disposed within the blade of the saw and the saw is held in intimate contact with that of the wheel and the teeth through the action of the guide-wheel 16. The guide-wheel 16 has a slot 17, disposed in its outer periphery into which the teeth 14 are permitted to engage. The slot is formed in the periphery of the wheel to prevent the filling of the same with foreign matter carried upon the saw and at the same time to insure registerable alignment between the teeth and the slot. The respective wheels being spaced apart the thickness of the saw blade causes a proper working relationship to maintain between the teeth and the saw. The wheels 15 and 16 are disposed upon shafts 18 and 19, secured to the inner side of the side frame of the winding head. To prevent the undue deposit of foreign matter carried upon the saw becoming deposited within the winding head, I have placed at the entry of the blade into the winding head a pair of cleaning brushes 20 and 21, one disposed upon either side of the blade and carried upon suitable spindles disposed within the side frame of the winding head. These spindles are actuated within slots in the side frame to compensate for the wear of the brushes and are held in position through the action of threaded locking nuts 22 and 23 disposed upon the outer end of the spindles 24 and 25. Power rotation is imparted to the cleaning brushes through the action of the driving element 26 which coacts with the sprocket 27, disposed upon the hub and is adapted to being driven through the action of the guide-wheel 15, the same being driven, indirectly, by the saw as the same coacts with the teeth disposed upon the outer periphery of the guide-wheel 15. The driving element 26 in turn drives the sprocket 28. Secured to the hub of the brush 21 is a gear 29 and, as the sprocket 28 and the brush 21, is driven by the driving element 26, the gear 29 is also driven. This gear 29 coacts with the gear 30 and also drives the brush engaging the oppositely disposed side of the saw, thus the saw is cleaned on either side by brushes operating at relatively high speeds of rotation. A reservoir 31 is disposed in the upper side of the frame of the winding head which has a liquid lubricator disposed therein, and the same is fed upon the blade of the saw through the orifice 32. A hand manipulative needle valve 33 engages the case. The needle valve is in registerable alignment with the orifice 32 and permits of a fine adjustment to be maintained to predetermine the amount of lubricator and cleaning compound to be deposited upon the face of the saw. Additional quantities of the compound may be admitted into a reservoir 31, through the filler cap 34, disposed in the outer surface of the frame. The shrouded winding drum is shrouded on either side, as illustrated at 35 and 36 to maintain the saw as wound upon the drums and between the shrouds disposed upon the sides of each of the drums. The end of the saw is made to engage upon the lug 38, the saw being threaded through an opening 37, disposed through the side wall of the inner surface of the winding drum and made to engage the lug 38. An electric switch 39, as illustrated in Fig. 3 and Fig. 7, is disposed upon the inner surface of the winding drum and the push button 40 extends therethrough. The push button 40 is normally maintained as an open circuit due to the action of the saw being wound about the drum which depresses the push button 40 within the switch, but when the saw is being unwound about the winding drum as the last lap of the winding of the saw about the drum is reached, the saw permits the push button 40 to be extended by the spring disposed within the switch, the electric circuit is closed and the magnetic clutch 41 is actuated and the electric current is broken at the same time.

In the operation of my device, the winding heads are generally manipulated in pairs, with an operator stationed at each winding head, one of which will be disposed at the oppositely disposed ends of the saw and where the same is being operated upon relatively larger timber each operator will be stationed remote from the other so as to permit of no communication between the two. For this reason, it is very necessary that an electric switch be disposed upon each winding head. The circuit is normally maintained as a closed circuit through the action of the hand of the operator of the winding head maintaining the same in closed condition.

I have found best results obtain where each winding head has two hand engaging handles 42 and 43. The electric switch for controlling the driving circuit is adapted to be manipulated by the hand of the operator controlling the handle 43 so that a digit of the hand may be made to manipulate the push button 44 associated with the handle to make and break the circuit. Disposed upon the handle 42, as illustrated in Fig. 3, is a braking device 45, having a shoe 46, adapted to engage the surface of the saw, as wound within the winding drum and to ride thereupon. In the event of the necessity therefor, the hand of the operator engaging the handle 42 may be made to manipulate the brake lever 45 in a manner and degree to stop the winding operation and therefore to stop the saw.

I have thus provided two means within each driving head for each operator to control the operation and driving force of each driving head. One by making and breaking the electric circuit for driving the head, the other by frictional resistance created through the action of the brake lever 45. In addition to the two manually manipulative means for controlling the operation of the device, I have provided the automatic reversing mechanism for reversing the operation of the device as hereinbefore described, the same to be automatically actuated upon the approach of the end of the saw blade on the winding drum that is being unwound, the object of which is to reverse the direction of movement of the saw.

To facilitate the handling of each winding head and to prevent undue physical exertion on the part of the operator of each winding head, I have provided a strut and support for partially supporting each winding head in addition to the work required in adjusting and aligning the head on the part of the operator of the same. A lug 47 is disposed on the underside of the casing to which a strut 48 is hingedly secured. This strut may be made to engage the base of the tree to be felled or be made to engage the log upon which the same is to be partially supported. A post 49 hingedly secured to the strut 48 may be made to stand substantially vertical and made to support the strut and the winding head disposed thereupon. The hand of the operator stabilizes the device and maintains the same in operating alignment.

In the operation of my device the power unit runs during the operation of the device and is started and stopped by manual manipulative switches and no mention is made of the same.

Referring to the wiring diagram, assuming that each winding head is in the hands of the operator and that the friction brake is inactive and that each of the operators has manipulated the switch 44, disposed upon each device and the electric circuit is a closed circuit. The wiring diagram shows the double throw switch 50 in position for the winding head 51 to start its initial winding operation and the winding head 51 has just reached the last lap of the saw about the winding drum and the switch 39 has been actuated because of the last lap of the saw releasing the push button 40 to cause the current to energize the magnet 53. The energizing of the magnet 53 actuates the core 54 of the magnet and thereby closing the switch 50 the current then flows through the switches 44 and through the conduit in the direction indicated by the arrow through the switch 50 and actuates the magnet clutch 5. A like operation is required to manipulate the winding head disposed upon the oppositely disposed end of the saw blade. In the operation of my device the length of the saw is immaterial as the shorter saw will be manipulated by the actuating mechanisms to drive the saw in a reciprocating motion a larger number of times per unit of time than will be required when a longer saw is used.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a sawing device, the combination of a pair of driven electrically controlled clutches, a shaft extending from each clutch, a pair of casings, each casing having a rotary drum therein driven by a shaft aforesaid, a saw extending between and having each end thereof connected to a drum, said saw to wind upon one drum and unwind from the other and vice versa, and means causing the aforesaid clutches to alternately drive their respective shafts and the cooperating drums to cause said saw to wind and unwind as aforesaid, said means comprising an electric switch carried by each drum, said switch having an outwardly urged arm which is released when the saw is unwound, the release of said arm closing an electric circuit, a magnetically controlled switch in said circuit, said last mentioned switch controlling an electric circuit through the aforesaid clutches, thereby causing the release of the clutch associated with the drum upon which the saw has been wound, and the engagement of the clutch associated with the drum upon which the saw has been unwound substantially as described.

2. In a sawing device, the combination of a pair of driven electrically controlled clutches, a shaft extending from each clutch, a pair of casings, each casing having a rotary drum therein driven by a shaft aforesaid, a saw extending between and having each end thereof connected to an individual drum, said saw to wind upon one drum and unwind from the other and vice versa, and means causing the aforesaid clutches to alternately drive their respective shafts and the cooperating drums to cause said saw to wind and unwind as aforesaid, said means including an electric circuit, a device for opening and closing said circuit, said device embodying an electric switch mounted to the interior of each drum, each switch being provided with an outwardly urged plunger penetrating the wall of drum, said plunger closing the switch when moved outwardly, and opening the switch when moved inwardly, the saw when wound upon the drums depressing said plunger, a magnetically controlled switch in said circuit, said last mentioned switch controlling an electric circuit, through the aforesaid clutches, thereby causing the release of the clutch associated with the drum upon which the saw has been wound, and the engagement of the clutch associated with the drum upon which the saw has been unwound substantially as described.

3. A device for operating saws, comprising a casing, a drum within said casing, a shaft carrying said drum, a clutch controlling the rotation of said shaft, said clutch being electrically operated, including an electric circuit therefor, a magnetically controlled switch in said circuit, a second ciruit controlling said switch, a switch in the second circuit, the second switch being included within the aforesaid drum and having an outwardly urged plunger closing said switch, said plunger extending through the wall of said drum, said drum being capable of having a saw wound thereon, the saw when wound upon said drum depressing said plunger and opening said switch, and when unwound, allowing said plunger to move outwardly to close said switch substantially as and for the purpose specified.

WILLIAM A. MEIGHAN.